United States Patent
Hurley et al.

(10) Patent No.: US 9,729,265 B2
(45) Date of Patent: Aug. 8, 2017

(54) NETWORK BASED ONSITE SUPPORT

(71) Applicant: Ciena Corporation, Hanover, MD (US)

(72) Inventors: Dane Martin Hurley, Ottawa (CA); David Weldon Boertjes, Ottawa (CA); David Casson Bownass, Ottawa (CA)

(73) Assignee: Ciena Corporation, Hanover, MD (US)

( * ) Notice: Subject to any disclaimer, the term of this patent is extended or adjusted under 35 U.S.C. 154(b) by 190 days.

(21) Appl. No.: 14/062,603

(22) Filed: Oct. 24, 2013

(65) Prior Publication Data

US 2015/0120927 A1    Apr. 30, 2015

(51) Int. Cl.
*H04J 14/02* (2006.01)
*H04L 12/24* (2006.01)
(Continued)

(52) U.S. Cl.
CPC ...... *H04J 14/0227* (2013.01); *H04J 14/0272* (2013.01); *H04J 14/0273* (2013.01);
(Continued)

(58) Field of Classification Search
CPC .......... H04M 3/301; H04M 3/22; H04M 3/26; H04M 3/28; G06F 21/31; G06F 21/34; G06F 21/35; H04L 63/0853; H04L 41/22; H04L 41/24; H04L 41/26; H04L 41/08; H04L 41/0803; H04L 41/0806; H04L 41/0813; H04L 41/082; H04L 41/0866; H04L 41/0869; H04L 41/0889; H04L 41/084; H04L 41/085; H04L 41/0853; H04L 41/0856; H04L 41/0859; H04B 10/07; H04B 10/0731; H04J 14/0227; H04J 14/0272; H04J 14/0273; H04J 14/0275
(Continued)

(56) References Cited

U.S. PATENT DOCUMENTS 6,433,903 B1 *  8/2002  Barry et al. ................. 398/79
6,829,247 B1 * 12/2004  Corkum et al. ............ 370/465
(Continued)

OTHER PUBLICATIONS

"ITU-T G.709/Y.1331—Interfaces for the optical transport network," ITU Telecommunication Standardization Sector, Feb. 2012, pp. 43-69, Section 15 "Overhead description".*
(Continued)

*Primary Examiner* — Vivek Srivastava
*Assistant Examiner* — William C McBeth
(74) *Attorney, Agent, or Firm* — Clements Bernard Walker PLLC; Christopher L. Bernard; Lawrence A. Baratta, Jr.

(57) ABSTRACT

Systems and methods for providing onsite support to technicians of a network include a hardware means for automatically detecting the presence of an onsite technician at the network node, and providing support to the onsite technician through a communications channel provided by the network node. The communications channel can be an optical service channel or a general communication channel (GCC) configured according to G.709 standard, for example. The hardware means can be further configured to determine an identity of the onsite technician and/or authenticate the onsite technician. The hardware means may comprise a dongle communicatively coupled to a network element or shelf at the network node via a universal serial bus (USB) port or BLUETOOTH connection.

18 Claims, 3 Drawing Sheets

(51) Int. Cl.
*H04L 29/08* (2006.01)
*H04L 29/06* (2006.01)

(52) U.S. Cl.
CPC ...... *H04J 14/0275* (2013.01); *H04L 41/0803* (2013.01); *H04L 41/0866* (2013.01); *H04L 41/22* (2013.01); *H04L 63/08* (2013.01); *H04L 67/26* (2013.01)

(58) Field of Classification Search
USPC ....... 709/223, 226, 224; 726/3, 4, 5, 20, 28; 398/9, 10, 11, 12, 13, 14
See application file for complete search history.

(56) References Cited

U.S. PATENT DOCUMENTS

| | | | | |
|---|---|---|---|---|
| 6,994,258 | B2* | 2/2006 | Lewis | 235/472.01 |
| 7,286,756 | B1* | 10/2007 | Marshall et al. | 398/31 |
| 7,489,867 | B1* | 2/2009 | Viscardi et al. | 398/58 |
| 7,607,014 | B2* | 10/2009 | Larson et al. | 726/5 |
| 7,623,784 | B1* | 11/2009 | Pan et al. | 398/58 |
| 7,962,588 | B1* | 6/2011 | Deopura | G06F 8/65 709/220 |
| 8,214,885 | B2* | 7/2012 | Blaisdell | 726/5 |
| 8,887,991 | B2* | 11/2014 | Htay | H04L 41/0806 235/375 |
| 2003/0134599 | A1* | 7/2003 | Pangrac | H04L 41/0806 455/67.14 |
| 2004/0013137 | A1* | 1/2004 | Lohr | H04J 14/0227 370/539 |
| 2004/0208507 | A1* | 10/2004 | Saunders | H04J 14/0227 398/19 |
| 2007/0022418 | A1* | 1/2007 | Velupillai | H04L 41/0681 717/168 |
| 2008/0211774 | A1* | 9/2008 | Woo | G06F 3/03543 345/166 |
| 2008/0310835 | A1* | 12/2008 | Lorentzen et al. | 398/9 |
| 2009/0077206 | A1* | 3/2009 | Dunn | H04L 41/0806 709/220 |
| 2009/0310615 | A1* | 12/2009 | Bernard | H04L 41/0893 370/401 |
| 2009/0317073 | A1* | 12/2009 | Hotchkiss | H04L 41/08 398/1 |
| 2009/0319572 | A1* | 12/2009 | Bernard | G06Q 10/06311 705/7.13 |
| 2010/0150546 | A1* | 6/2010 | Shrikhande | H04J 14/0227 398/10 |
| 2011/0029658 | A1* | 2/2011 | Werth | H04L 67/34 709/224 |
| 2011/0211827 | A1* | 9/2011 | Soto | H04B 10/071 398/25 |
| 2011/0305136 | A1* | 12/2011 | Pan | H04L 41/0663 370/218 |
| 2013/0136445 | A1* | 5/2013 | El-Ahmadi | H04B 10/07 398/22 |
| 2013/0142509 | A1* | 6/2013 | Connolly | H04J 3/1652 398/44 |
| 2013/0191885 | A1* | 7/2013 | Hubner et al. | 726/5 |
| 2013/0290791 | A1* | 10/2013 | Basile | H04L 41/22 714/47.1 |
| 2014/0050472 | A1* | 2/2014 | Hinderthur et al. | 398/14 |
| 2015/0043553 | A1* | 2/2015 | Swinkels | H04L 41/0806 370/338 |
| 2015/0061883 | A1* | 3/2015 | Thompson | H04L 41/0879 340/815.4 |
| 2015/0135082 | A1* | 5/2015 | Slay, Jr. | H04L 67/20 715/736 |

OTHER PUBLICATIONS

"Open Transport Network (OTN): Optical Management System (OMS)," OTN Systems NV, 2011.*

* cited by examiner

NETWORK BASED ONSITE SUPPORT

FIELD OF DISCLOSURE

Disclosed embodiments are directed to onsite support to technicians of a network, and more particularly for providing intelligent onsite support, by automatically detecting presence of onsite technicians and providing support through communication channels of the network.

BACKGROUND

Optical networks based on fiber-optic communication play a popular role in many modern communication systems. Optical networks are particularly advantageous in long distance and high bandwidth applications due to low attenuation and interference characteristics. Modern optical networks are becoming increasingly complex and involve complex mesh topologies. Solutions such as reconfigurable optical add-drop multiplexer (ROADM) can provide the ability for remote traffic switching in optical networks. ROADM enables network operators or personnel in a network operation center (NOC) to quickly and flexibly respond to network changes, for example, by establishing new light-paths or optical communication channels and releasing existing light-paths. ROADMs are typically required to satisfy three main characteristics or features, namely, colorlessness, directionlessness, and contentionlessness, or "CDC" as known in the art. A CDC architecture is one that satisfies the CDC requirements of a ROADM implementation. Implementing a CDC architecture is complex, particularly when ROADM sites involve multiple degrees of ROADM structures being present. There is a demand for increasingly complex CDC architectures that follow many different routes through a layer 0 (L0) mesh optical network, for example.

Given the complex infrastructure involved in implementing meshed CDC architectures, many difficulties are commonly seen in sites where they are deployed. Organization and coordination of onsite support activities, such as, maintenance and network deployments are challenging, because it is difficult for onsite technicians to understand the impact of performing maintenance on a particular piece of equipment. An action performed on a single piece of equipment can impact many wavelengths along different paths in the network.

Additionally, reconfiguration of the networks is also becoming increasingly complex because network reconfiguration can require the coordination of several technicians across many different and distant locations. Miscommunication during a network reconfiguration can lead to unplanned traffic interruptions, as well as undesirable delays. The traffic interruptions can sometimes be reported to the NOC as a network outage, which is a much more serious problem, where in many instances, such problems originate due to minor procedural errors. Procedural errors are common because of complex usage manuals and guidelines which are required to be followed by onsite technicians, and this leads to a high likelihood of human error. Moreover, onsite technicians typically communicate with the NOC through devices such as, personal computers, smart phones, laptops, or the like. These devices can vastly vary in terms of product lines, operating systems and configurations, which leads to inconsistencies in support and communication protocols among the various devices.

Due to the aforementioned reasons, there is a need for simplified and efficient support for onsite technicians, wherein the support is consistent and independent of the skill level of the onsite technicians.

SUMMARY

Exemplary embodiments relate to systems and methods for providing onsite support to technicians of a network, and more particularly for providing intelligent onsite support, by automatically detecting presence of onsite technicians and providing support through communication channels of the network.

For example, an exemplary embodiment is directed to a method of providing support to an onsite technician at a network node, the method comprising: automatically detecting, by a hardware means at the network node, the presence of the onsite technician at the network node, and providing support to the onsite technician through a communications channel provided by the network node.

The method may further comprise determining an identity of the onsite technician through the hardware means and/or authenticating the onsite technician through the hardware means. The hardware means may comprise a dongle communicatively coupled to a network element or shelf at the network node, and may be communicatively coupled to the network element or shelf via a universal serial bus (USB) port or BLUETOOTH connection.

In an example, the communication channel provided by the network node is an optical service channel; or a general communication channel (GCC) configured according to G.709 standard. Further, providing support to the onsite technician may be carried out by operators at a network operation center (NOC), and a network management system (NMS) may be configured to manage communications between the NOC and the network node on the communications channel.

Another exemplary embodiment may be directed to method of receiving onsite support at a network node, the method comprising: coupling a hardware means to the network node in order to enable detection of an onsite technician at the network node, and receiving support for the onsite technician through a communications channel provided by the network node.

Yet another exemplary embodiment may be directed to a network system comprising a network node, a communication channel provided by the network node, means for automatically detecting presence of an onsite technician at the network node, and means for providing support to an onsite technician located at the network node through the communication channel.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Exemplary embodiments are directed to techniques for improving existing onsite support platforms for mesh networks, such as, optical networks. The support platforms can pertain to aspects such as setup, maintenance, and repair. In some aspects, the embodiments provide automated and/or standardized support platforms to assist onsite technicians located at network nodes. A command center (e.g., a NOC) can involve personnel and skilled operators who may be able to oversee and provide support to the onsite technicians. Further, a network management system (NMS), which can include a software application, aspects of which may be implemented at the NOC, can be configured to monitor and manage communications between the NOC and the onsite technician. The NMS can be further configured to oversee the provision of instructions or support to the onsite technician and monitor progress/completion of tasks for which the onsite technicians have been requisitioned.

Some exemplary embodiments can involve automatic detection of the presence of an onsite technician at a node. Such automatic detection can further involve aspects of identification of a technician (e.g., a technician's identification name/number) and/or aspects of authentication (e.g., determining whether the technician accessing the node is an authorized technician). Embodiments can provide specific task based instructions (or in other words, simplified instructions) and guidance to the onsite technician (e.g., one who is detected/identified/authenticated), while maintaining a global visibility and control across the various nodes. On the one hand, such specific task based instructions provided to an onsite technician eliminate the need for highly skilled or extensively trained technicians for each onsite visit, while on the other hand, the global visibility ensures that any inadvertent errors caused at a single node do not percolate to other nodes or cause widespread traffic disruption. Where currently existing support structures require onsite technicians to be familiar with complicated usage manuals, exemplary systems can analyze faults or repair needs at various nodes through application specific software and/or control of skilled operators at the NOC. Exemplary systems can then provide dedicated instructions to the onsite technicians, limiting such instructions to tasks which require involvement of the technicians, while disallowing the technicians from inadvertently affecting any ancillary features that are not germane to the tasks at hand.

Moreover, the exemplary embodiments address the need for reliable communication to the onsite technicians. In more detail, in existing conventional optical network systems, for example, onsite technicians may need to rely on external communication lines, such as, voice or data communication (e.g., through a landline phone connection, cellular phone, Internet access through a mobile phone or laptop, etc.) in order to communicate with the NOC. However, in many remote locations, these external communication lines for such voice or data communication may not be present or adequate. For example, the onsite location may not be covered by a cellular network, or have easy access to a phone line or the Internet. Alternatively or additionally, the network node at the onsite location may be housed in a secure environment where such external communication lines may be disallowed or shielded. Thus the onsite technicians' ability to communicate effectively with the NOC can be restrained, and thus, the likelihood of a human error perpetrated by the isolated onsite technician may be high. Accordingly, in order to overcome these limitations of conventional systems and address the needs for reliable communication, exemplary embodiments can be configured to utilize communication channels provided by the network node for communications between the onsite personnel at the network node and other network nodes or the NOC. As used herein, "communication channels provided by the network node" refer to integrated communication channels, such as, optical service channels of the optical network, and can sometimes include a general communication channel (GCC) as defined by the G.709 standard, which is an in-band side channel used to carry transmission management and signaling information within optical transport network elements or optical network nodes. More specifically, the phrase communication channels provided by the network node can exclude the above-identified external communication lines in some aspects. In other words, existing communication channels, such as, optical service channels used for data communication in exemplary optical networks can serve a dual purpose of carrying information pertaining to the optical network communication during normal operation, as well as, server as a communication channel for communication with an onsite technician during repair of the network node, for example.

In order to support the above exemplary embodiments, a hardware means or hardware device can be configured to connect to the communication channels of the optical network at a remote node, and an onsite technician can communicate with the NOC through the hardware device. The hardware device can be a network device or device enabled to access a network, such as, the optical network, and include a display means and an input/output means which can enable one or two way communication. In some aspects the NMS can automatically detect the presence of the onsite technician when the designated hardware device gets plugged or connected to a network node. Thereafter, the tasks which need to be performed at the node can be conveyed to the technician through the hardware device, for example, by means of the display means. The onsite technician may be able to establish a two way communication, if required, through the input/output means. Exemplary hardware device and features thereof will be further described in the following sections.

Figure 1:
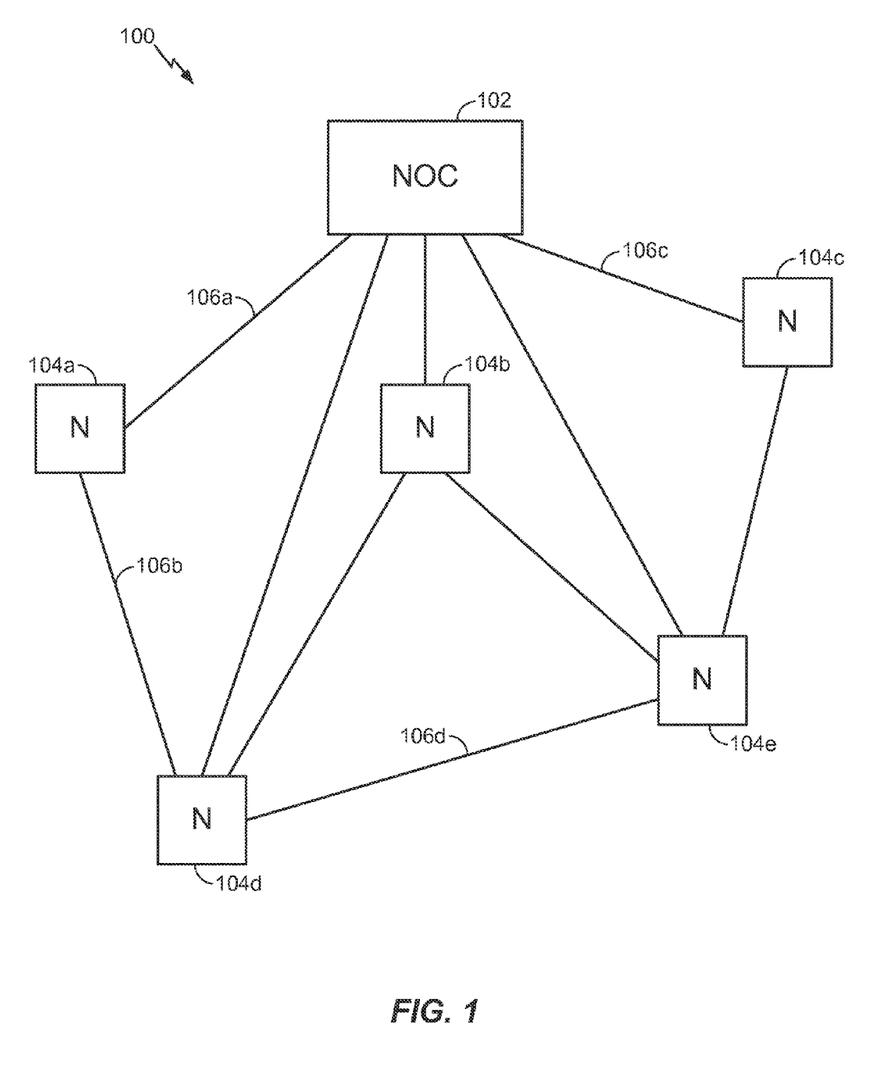
FIG. 1 illustrates an exemplary network where embodiments pertaining to onsite support are applicable.

With reference now to FIG. 1, a simplified schematic view of network 100, configured according to an exemplary embodiment is illustrated. Network 100 may be, for example, an optical network. In particular cases, network 100 may relate to medium or large scale deployments where coordination among multiple groups of technicians at disparate onsite locations may be required. Such scenarios are commonly seen where network 100 may relate to a carrier customer, where the multiple groups are required to accomplish maintenance tasks. According to exemplary embodiments, coordination among these groups in disparate locations can be centrally managed by system level expert software, for example, implemented as a network management system (NMS), which may be controlled, managed, or implemented at a network operation center (NOC) and can enable provision of targeted instructions to personnel at the various locations.

With continuing reference to FIG. 1, NOC 102 manages or controls a plurality of network elements or network nodes, generally illustrated as nodes 104a-e, which may be located at remote or distant locations. There is no restriction on the technology or topology of network 100. In one example, network 100 may be configured as an optical network, in a mesh topology. One or more nodes 104a-e may be in communication with one another, and NOC 102 may be in either direct communication with each node 104a-e, or indirect communication with a node through another node. Communications between nodes 104a-e and NOC 102 can be through one or more communication channels, a few of which have been representatively identified by communication channels 106a-d in FIG. 1. Communication channels 106a-d may be provided by nodes 104a-e and/or NOC 102 and may include general communication channels (GCC) configured according to the G.709 standard mentioned above. A dense wavelength division multiplexing (DWDM) can be used in these communication channels, where the communication channels may also be referred to as fibers or light paths. A DWDM technology relates to optical multiplexing for increasing bandwidth over existing fiber networks, by combining and transmitting multiple signals simultaneously at different wavelengths on the same fiber. In some cases, architectures such as the aforementioned ROADM, CDC, etc., may be applicable to network 100. One or more of nodes 104a-e can comprise one or more optical network elements, such as, a terminal, a splitter, a repeater, an end user device, etc. One or more of nodes 104a-e may be configured for onsite support according to exemplary embodiments. Network 100 may be managed using a network management system ("NMS," not explicitly illustrated).

In one example, network 100 can be configured for automatic detection, identification, and/or authentication of onsite technicians at one or more of nodes 104a-e. Such detection, identification, and/or authentication can be performed through the NMS, in conjunction with a hardware means associated with nodes 104a-e, which will be further explained below, and related information can be conveyed to NOC 102, for example, through one or more of communication channels 106a-d. The platform provided by the exemplary NMS may be further configured as a tasking system, in that specific tasks may be assigned based on particular needs of the nodes of interest. The tasks referred to herein, may refer to any action or sequence of actions that may need to be performed in the course of a setup, installation, maintenance, repair, etc., of one or more elements present in a node of interest, for example, where an onsite technician may be present. The platform may further provide a permission management system, in that, permissions may be granted for specific tasks or tasks which may potentially impact network 100. For example, such permissions may relate to identifying actions which may need to be taken at a node, and requiring acknowledgment or permission from NOC 102 to execute such actions. Any other onsite task may similarly have such a permission associated with it, prior to receiving which, the task may not be allowed to commence or proceed. In some cases, NOC 102 may require notification that a task has been completed, following which, NOC 102 may evaluate whether the results are satisfactory and provide any follow up actions to be undertaken based on the analysis. The above features of the exemplary NMS can ensure efficient handling of tasks by onsite technicians.

In some embodiments, one or more components of one or more of nodes 104a-e may include a mobile support platform. For example, one or more of nodes 104a-e can include a network component, or "shelf" as known in the art, on which tasks may need to be performed by an onsite technician with access to the shelf. A hardware means or device can be provided to connect to the shelf, and include an interface for the technician to communicate with an operator at NOC 102 and/or interact with the NMS. The hardware device can be particularly designed for embodiments or an existing hardware device can be configured for exemplary embodiments, for example, using application software. In some examples, the hardware device can be a handheld processing device, such as, a mobile phone, laptop, PDA, tablet PC, or the like, which a technician can plug in or connect to the shelf. In one case, the hardware device may be communicatively coupled to a BLUETOOTH dongle which can connect to the shelf via a BLUETOOTH interface, for example.

Figure 2:
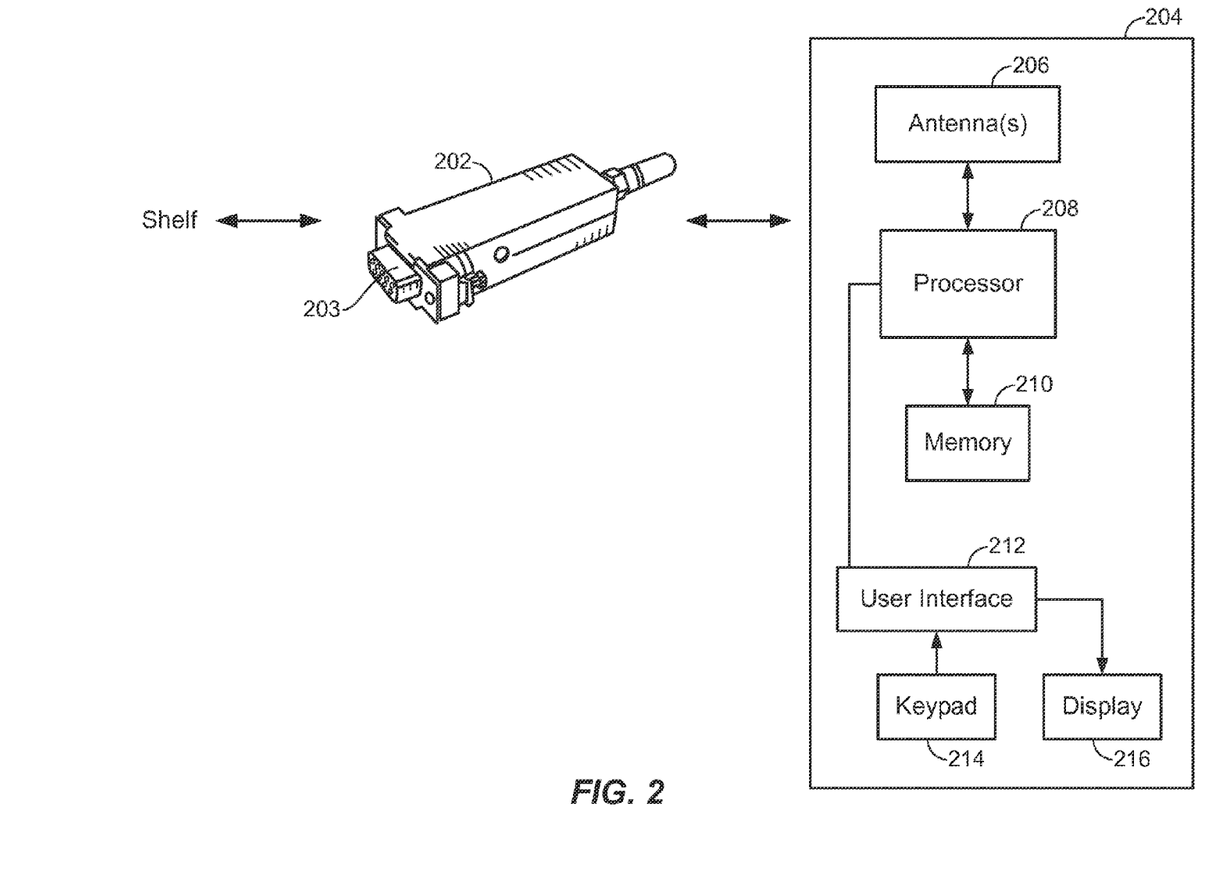
FIG. 2 illustrates a dongle or hardware device to connect to a network node.

With reference to FIG. 2, an exemplary setup is illustrated, where dongle 202 can be communicatively coupled to a shelf of a network node, for example, through port 203. Port 203 may be, for example, a universal serial bus (USB) port. Dongle 202 can be communicatively coupled to hardware device 204. Hardware device 204 may be a mobile device. While illustrated as separate structures, in some implementations, dongle 202 and hardware device 204 may be implemented as a single unit. Hardware device 204 can include functionality commonly found in mobile devices. A non-exhaustive illustration is provided in FIG. 2, where hardware device 204 can include one or more antenna(s) 206 in order to communicate with dongle 202, for example. Processor 208 can be configured to process information received from antenna(s) 206, as well as instructions and/or data stored in memory 210. In addition, processor 208 can also process instructions or data received from user interface 212 via keypad 214 and supply display information to a user via display 216. As a skilled person will recognize, many other features and functionalities may be present in the exemplary setup described herein, but an exhaustive description of these is not provided herein for the sake of brevity.

In some implementations, when an onsite technician connects to a shelf through dongle 202, NOC 102 may be informed of the presence of the onsite technician. As previously explained, further to merely detecting presence of any onsite technician, embodiments can also include specific aspects such as, detecting an identity of the onsite technician (based for example, on identification associated with the), and even further, involve authentication, based for example, on a password or similar other means associated with recognizing the onsite technician as an authorized/expected onsite technician at the particular node's site. Upon connection to the shelf, NOC 102 may further commence collection of logs or other information pertaining to the shelf. In some cases, a specific application may be launched, for example, by executing on hardware device 204. The application may include various visualization features or interactive communications through user interface 212, as well as, keypad 214 and display 216, for example. Information about the shelf can be automatically backed up as databases in memory 210 and/or at NOC 102. In the event of unexpected failures during execution of tasks at the shelf, for example, the backed up data may be relied upon for restoring the shelf to correct functionality.

Regardless of the particular device used, an exemplary application can execute on the hardware device to enable the features described herein. In one example, when the hardware device is connected to the shelf at one of the nodes 104a-e, a mobile application running on the hardware device can execute a predetermined series of actions or program code, which can act for authentication purposes or to familiarize the hardware device with the particular components or configurations of the shelf that it is connected to. A known location, for example, as related to network 100, of the shelf may be displayed on the hardware device. For example, a textual or graphical representation of network 100 may be provided, with a tag indicating the location of the shelf therein. The tag may contain a message such as "you are here," which informs the technician as to where the shelf is located within network 100. Geographical location can also be similarly provided if required. The mobile application can then set a predefined system parameter, for example, which can be recognized by the NMS, and operators or personnel at NOC 102 can thereby be notified as to the presence of the onsite technician.

Once NMS and/or NOC 102 is aware of, or has been alerted to, the presence of an onsite technician at the shelf, in some cases, further messages can be sent to the hardware device for the attention of the technician. These messages can include instructions such as, "wait for further instructions," or tasks such as, "replace amplifier in slot 2," "clean fiber on port 5 of slot 2," etc, as may be relevant to the particular shelf Once each task or set of tasks/instructions are conveyed to the technician, exemplary aspects can also include predefined follow up checks. In some cases, impact or potential risks of carrying out a particular task will be known in advance. The NMS can try to preempt such risks from materializing. For example, following the above sample instruction, impact of the task will be assessed and the NMS can convey a message which states "replacing amplifier in slot 2 will impact the following wavelengths: 1, 7, 21, 44, and 88." The NMS can then require the technician's input to a follow up prompt such as, "proceed?" The onsite technician may then determine that particular caution may be required based on the assessed risk, and then decide whether to proceed or not based on particular conditions. The onsite technician may then take a suitable action or defer to NOC 102 for further instructions. The NMS can continue to monitor progress throughout a session or task and send periodic checks or messages of caution as above.

According to previously mentioned aspects, the mobile application can also implement permission management in conjunction with the NMS. Further, once the onsite technician receives the above task, "replace amplifier in slot 2," the mobile application can present a shelf level diagram to assist the technician. The NMS, for example, under the direction of NOC 102, can send a lamp test to slot 2, and provide step by step instructions and monitor completion where possible (e.g., confirm that facilities have been placed out of service (OOS), circuit pack (CP) removed, etc.). The technician can then be presented with instructions related to the fiber-optic network or "fibering" instructions, such as "Slot 2 Port 7 to Slot 3 Port 21".

Once the tasks have been completed, for example, related to onsite maintenance, the technician can notify NOC 102 of completion through the mobile application or support platform. The NMS can then execute checks, such as, performing a fiber audit. As used herein, "fiber audit" refers to measurement of loss through a fiber jumper connecting two circuit packs where the measurement is automated by system software such as the NMS. If traffic related to the node of interest or one or more other nodes 104a-e had been interrupted for allowing the onsite work to proceed, the NMS can restore the traffic and evaluate network 100 for expected behavior. If there are no deviations from expected behavior and no further action is required, the NMS can send a "Job Complete" message to the onsite technician. In addition, some embodiments can include automatic logging/storage of all timelines and event histories related to such onsite activities.

Accordingly, the exemplary techniques can coordinate onsite involvement of technicians and reduce the overall effort and skill levels required by a technician to be able to carry out necessary tasks at a node. Embodiments reduce dependence on the onsite technician's skill set with the simplified onsite instructions. Automatic logging capabilities can provide the logs and documentation regarding the maintenance tasks performed, and timelines regarding when they were started and completed. Deleterious effects of system reconfiguration and potential network outages can be avoided by providing adequate early warnings and cautions to the onsite technicians to minimize human error. Moreover, conveying instructions using the NMS. Through the fiber or communication channels 106a-d of network 100 minimizes dependence on ancillary technologies or infrastructure, such as, a phone line or Internet connection in order for the onsite technicians to communicate with NOC 102.

Figure 3:
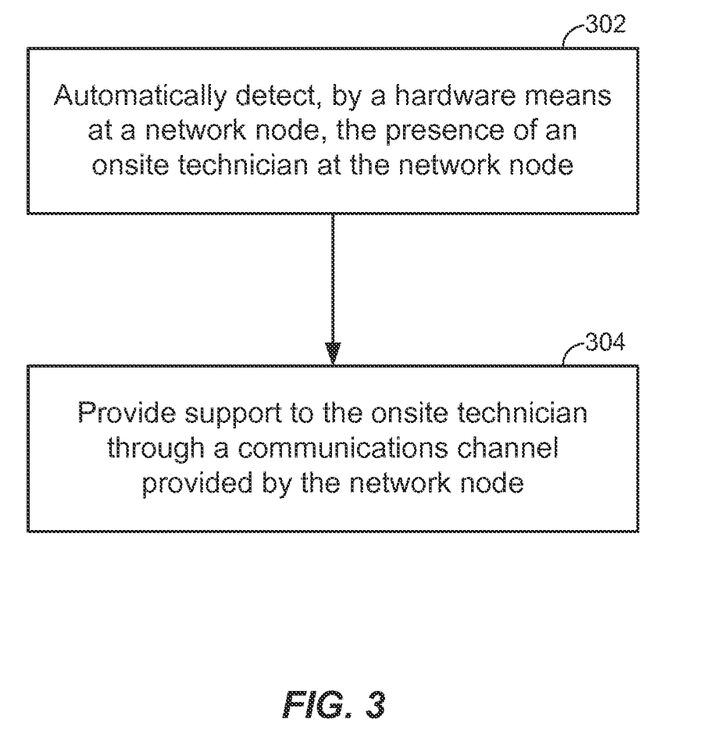
FIG. 3 illustrates a sequence of steps pertaining to an exemplary method of providing onsite support at a network node.

It will be appreciated that embodiments include various methods for performing the processes, functions and/or algorithms disclosed herein. For example, as illustrated in FIG. 3, an embodiment can include a method of providing support to an onsite technician at a network node (e.g., nodes 104a-e of network 100), the method comprising: automatically detecting, by a hardware means (e.g., 202, 203, 204) at the network node, the presence of the onsite technician at the network node—Block 302; and providing support to the onsite technician through a communications channel (e.g., 106a-d) provided by the network node—Block 304.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for providing onsite support for network nodes through network channels. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of providing support to an onsite technician at a network node, the method comprising:
    automatically detecting, by a network management system directly communicating with a hardware device comprising a mobile device via a dongle directly connected at the network node, a presence of the onsite technician at the network node; and
    providing support communications via the mobile device to the onsite technician through a communications channel provided by the network node in a network, wherein the hardware device is configured to access the communications channel at the network node,
    wherein the communications channel is over one of an optical service channel and a general communication channel (GCC) configured according to ITU-T Recommendation G.709 standard, wherein the dongle is communicatively coupled to a network element or shelf at the network node to access the one of the optical service channel and the GCC and to communicate via an antenna to the mobile device to enable the mobile device to communicate via the one of the optical service channel and the GCC, and
    wherein the mobile device executes an application for enabling the support communications and for providing a user interface for visualization of the network node and other network nodes connected via the communication channel, wherein the support communications comprises collection of logs and information pertaining to the network node and the other network nodes, and wherein the logs and information are displayed via the user interface.

2. The method of claim 1, further comprising determining an identity of the onsite technician through the hardware device.

3. The method of claim 1, further comprising authenticating the onsite technician through the hardware device.

4. The method of claim 1, wherein the support communications to the onsite technician is from operators at a network operation center (NOC).

5. The method of claim 4, further comprising configuring the network management system to manage communications between the NOC and the network node on the communications channel.

6. The method of claim 5, wherein the NMS is configured to provide task based instructions to the onsite technician.

7. The method of claim 5, wherein the NMS is configured to assess potential risk of execution of task based instructions and to provide associated warnings to the onsite technician.

8. The method of claim 5, wherein the NMS is configured to perform fiber audits on communication channels of the network to monitor progress by the onsite technician.

9. The method of claim 1, further comprising associating permissions with task based instructions, and requiring onsite technicians to obtain associated permission for an associated task, prior to executing the associated task.

10. The method of claim 1, wherein the dongle is communicatively coupled to the network element or shelf via a universal serial bus (USB) port or wireless connection.

11. The method of claim 1, further comprising providing visualization features and interactive communications through a user interface associated with the application.

12. The method of claim 1, further comprising backing up data associated with the network node on the mobile device and using the backed up data for restoring functionality in the network node responsive to unexpected failures during execution of tasks by the onsite technician on the network node.

13. The method of claim 1, further comprising:
    providing instructions to the onsite technician during tasks on the network node;
    monitoring progress throughout the tasks of the onsite technician comprising requiring follow up prompts from the onsite technician to proceed in the tasks; and
    logging all timelines and event histories of the tasks.

14. The method of claim 13, further comprising:
    assessing risk based on the progress and requiring the follow up prompts based on the risk.

15. The method of claim 1, wherein the application authenticates the onsite technician.

16. A method of receiving onsite support at a network node, the method comprising:
  coupling a hardware device comprising a mobile device to the network node via a dongle directly connected to the network node in order to enable detection of an onsite technician at the network node by a network management system communicating with the mobile device through the dongle; and
  receiving support communications via the mobile device for the onsite technician through a communications channel provided by the network node in a network, wherein the hardware device is configured to access the communications channel at the network node,
  wherein the communications channel is over one of an optical service channel and a general communication channel (GCC) configured according to ITU-T Recommendation G.709 standard, wherein the dongle is communicatively coupled to a network element or shelf at the network node to access the one of the optical service channel and the GCC and to communicate via an antenna to the mobile device to enable the mobile device to communicate via the one of the optical service channel and the GCC, and
  wherein the mobile device executes an application for enabling the support communications and for providing a user interface for visualization of the network node and other network nodes connected via the communication channel, wherein the support communications comprises collection of logs and information pertaining to the network node and the other network nodes, and wherein the logs and information are displayed via the user interface.

17. The method of claim 16, further comprising communicating with operators at a remote network operation center (NOC) or a technician at another network node through the communications channel.

18. A network system comprising
  a network node,
    wherein a communications channel is provided by the network node over a network, wherein the communications channel is over one of an optical service channel and a general communication channel (GCC) configured according to ITU-T Recommendation G.709 standard;
  a mobile device coupled to the network node via a dongle and configured to automatically provide detection of a presence of an onsite technician at the network node to a remote network management system and configured to access the communications channel; and
  the remote network management system configured to provide support communications via the mobile device to the onsite technician located at the network node through the communications channel and the dongle, wherein the dongle is communicatively coupled to a network element or shelf at the network node to access the one of the optical service channel and the GCC and to communicate via an antenna to the mobile device to enable the mobile device to communicate via the one of the optical service channel and the GCC,
  wherein the mobile device executes an application for enabling the support communications and for providing a user interface for visualization of the network node and other network nodes connected via the communication channel, wherein the support communications comprises collection of logs and information pertaining to the network node and the other network nodes, and wherein the logs and information are displayed via the user interface.

\* \* \* \* \*